United States Patent [19]

Raymond

[11] Patent Number: 4,846,216

[45] Date of Patent: Jul. 11, 1989

[54] FLUID POWER VALVE DEVICE

[75] Inventor: Robert E. Raymond, 495 Military Rd., Zanesville, Ohio 43701

[73] Assignee: Robert E. Raymond, Zanesville, Ohio

[21] Appl. No.: 214,760

[22] Filed: Jul. 5, 1988

[51] Int. Cl.[4] .............................................. F16K 15/02
[52] U.S. Cl. ............................... 137/516.27; 137/529; 251/368
[58] Field of Search ...................... 137/516.27, 516.25, 137/529; 251/368

[56] References Cited

U.S. PATENT DOCUMENTS

| | | | |
|---|---|---|---|
| 1,029,464 | 6/1912 | Ruwell | 137/516.27 X |
| 1,094,267 | 4/1914 | Sullivan | 137/516.27 X |
| 1,322,938 | 11/1919 | Parker | 137/516.27 X |
| 1,693,177 | 11/1928 | Hodgart et al. | 137/516.27 |
| 2,165,611 | 7/1939 | Campbell et al. | 137/516.27 X |
| 2,234,932 | 3/1941 | Schlaupitz | 137/516.27 |
| 2,431,769 | 12/1947 | Parker | 137/516.27 X |
| 3,195,552 | 7/1965 | Rasmussen | 251/368 X |
| 3,375,844 | 4/1968 | Mercier et al. | 137/516.27 X |
| 3,767,164 | 10/1973 | Robinson | 251/368 X |

*Primary Examiner*—John Rivell
*Attorney, Agent, or Firm*—Francis T. Kremblas, Jr.

[57] ABSTRACT

A fluid power control valve apparatus is disclosed and is characterized by combining desirable features of both a spool type valve element and a poppet type valve element. A spool element is provided with one end adapted to be seated in a poppet valve seat provided in the bore in which the spool is slideably mounted. The poppet seat is located in the bore between two flow ports. The poppet end of the spool engages and becomes fully seated only after the spool has passed a bore position closing one of the ports to operative flow and operates to seal the bore from the conventional leakage flow associated with spool elements. Also disclosed is a method of manufacturing such an apparatus in a two piece assembly to greatly simplify manufacture of a precise poppet seat within the spool bore.

4 Claims, 3 Drawing Sheets

FLUID POWER VALVE DEVICE

BACKGROUND

In fluid control applications, the leakage associated with conventional spool valve elements is undesirable and in certain applications cannot be tolerated. In the latter circumstances, additional circuit valve elements must be employed to prevent such leakage in the spool's closed position to effect the control function desired. Even expensive and precise manufacturing methods such as "selective fit" technique cannot totally eliminate the normal leakage associated with valve spool elements which must slide within the spool bore in a close fit relationship.

On the other hand, two-way poppet elements have become popular because precise manufacture permits a seated metal to metal relationship to be obtained between the poppet element and the poppet seat which essentially prevents leakage. However, it is much more difficult to obtain precise control using normal poppet valve elements under modulating control conditions as compared to the very precise control under such conditions obtainable with spool type elements.

Given the fact that poppets work well in a system requiring only a simple open or closed condition and prevents leakage problems and spool valves offer precise control of modulating conditions but present a leakage problem, the prior art has failed to provide a valve assembly wherein only the desirable characteristics of both are combined in a single practical assembly wherein the valve element functions as a normal spool element for operative flow control functions and also includes the non-leakage attribute of a poppet element only for closed or holding positions.

Prior to the present invention, leakage problems related to spool valves were attacked by very expensive, precision manufacturing techniques and/or long lap distances between ports. However, this only tends to reduce, not eliminate, leakage inevitable between a spool movable in a bore. If control considerations permitted, a poppet valve would be employed, however, the instability and lack of precision control inherent under modulating control conditions often do not warrant use of a poppet valve.

SUMMARY OF INVENTION

The present invention relates generally to fluid power control valves and in particular to a novel control valve assembly wherein a spool valve element is permitted to operate in the typical spool valve manner to control operative fluid flow and as a poppet element to control and prevent leakage when the element is in the closed position.

This unique combination is accomplished by arranging a spool element in a bore provided with axially spaced flow ports operable between open and closed positions relative to one of said ports.

Further, one end of the spool is configured to engage an annular valve poppet seat located within the bore a finite distance from the flow port controlled by the spool and intermediate the two flow ports to seal any leakage normally occuring around the spool and its bore when it is in the closed position.

Therefore the spool effectively has a first closing position relative to operative flow through the associated flow port and upon further moving beyond such first closing, a second closed position relative to any communication of leakage between the spool and its bore from one flow port to the other.

In the opposite direction, as soon as the spool becomes unseated from the poppet valve seat, but prior to cracking open the flow control port, the spool will function in the conventional manner as pressure forces act upon the full area of the end of the spool unencumbered by any engagement with the poppet valve seat.

Also disclosed is the preferred embodiment and method of manufacturing the same wherein a novel sleeve insert is employed to create the valve poppet seat within the bore to permit very economical construction of the assembly of components without the need for exceptional and expensive manufacturing techniques or adherence to exceptional manufacturing tolerances.

Further, a relatively simply coining process is used to create a very precise fit between the poppet end of the spool and the poppet seat to achieve the desired sealed condition preventing leakage between flow ports in the closed position of the spool.

In accordance with the present invention, a single valve assembly is provided wherein the advantageous characteristics of a spool element controlling flow under modulating conditions is combined with the meritorious characteristics of a poppet element relative to leakage under closed conditions.

Further, the present invention provides a relatively simple assembly of components which do not require exceptional manufacturing techniques to create the poppet valve seat within the normal precision bore required for conventional spool element operation by utilizing a novel insert assembly to create the poppet seat and utilizing a coining process to provide a very precise fit between the spool poppet end and the seat.

IN THE DRAWINGS

DETAILED DESCRIPTION OF PREFERRED EMBODIMENT

Figure 1:
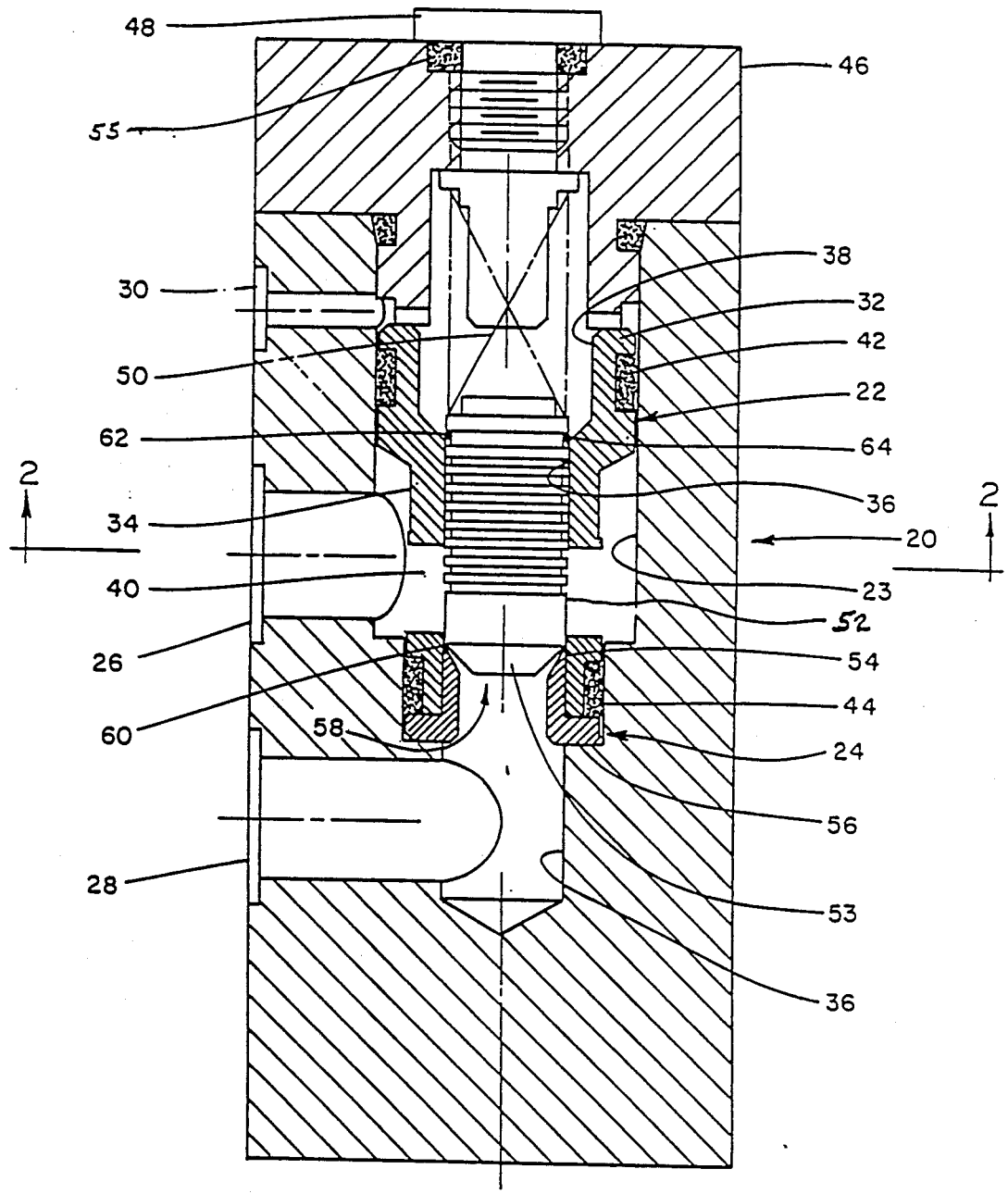
FIG. 1 is a front sectional view of a fluid power control valve apparatus constructed in accordance with the present invention, the section being taken along the centerline of the apparatus.

A fluid power control apparatus constructed in accordance with the present invention is shown in FIG. 1 and includes an outer housing, indicated generally at 20, an annular first sleeve component indicated generally at 22, and an annular second sleeve component, indicated generally at 24.

Housing 20 and first sleeve component 22 are of conventional manufacture as applied to a variety of typical, well-known spool valve arrangements used for many years in the hydraulic industry. Housing 20 is provided with operative flow ports 26 and 28 and a pilot port 30.

Sleeve 22 is fixed within an annular opening 23 provided in housing 20 and is provided with an enlarged upper end 32 and a lower end 34 having a smaller diameter which surrounds a precision honed spool bore 36 provided below a larger annular recess 38 formed within the upper end 32. Spool bore 36 is honed to conventional tolerances normally associated with conventional spool valve operation and includes an extension thereof which is formed in the lower portion of housing 20 which communicates with housing flow port 28.

Sleeve 22 also is conventionally provided with a spool flow port 40 aligned to communicate with flow port 26 in housing 20. As shown, flow port 40 is in the form of arcuate slots on opposing sides of sleeve 22, however, other conventional port designs may be used as desired.

O-rings 42 and 44 are conventionally provided in suitable recesses provided on the outer surface of sleeve 22 to assure adequate sealing of fluid leakage between the outer sleeve and the inner surface of the annular opening 23 in housing 20.

A cap member 46 is conventionally removably mounted over the top of housing 20 and provides means for retaining a bias spring 50, shown diagrammatically by broken lines in FIG. 1. Cap member 46 includes a threaded bore for receiving a threaded member 48 which provides access to spring 50. Spring 50 also engages the upper end of a spool element 52 slideably received in operable relationship within spool bore 36. A conventional O-ring 55 is provided to seal the relationship between cap member 46 and the inner annular space within housing 20.

In addition to the spring force, pilot pressure may be introduced via pilot port 30 and represents the opening threshold force necessary to be applied to the opposing end of the spool via fluid pressure present at flow port 28 and communicated to the lower extension of spool bore 36 provided in housing 20 to cause upward movement of spool element 52.

Up to this point, the elements and components described are of a conventional and well-known nature in the function and operation of a conventional spool element to control fluid flow between ports 26 and 28 responsive to the differential forces applied to the end areas of the spool between fully open, fully closed and throttling positions.

However, the nature of the operation of the control assembly is drammatically altered by the addition of a poppet valve seat formed by second sleeve 24.

Second sleeve component 24 comprises an annular upper portion 54, an annular shoulder 56 and an inner bore 58 axially aligned with spool bore 36. The outer diameter of upper portion 54 is honed to the same specifications as the outer diameter of spool element 52 so as to be in close fitting relationship to spool bore 36.

An annular poppet seat 60 is fored by preferably providing a taper in the upper opening of bore 5B using conventional machining methods.

The lower end of spool element 52 is ground to provide a tapered poppet style end 53 adapted to closely mate with the poppet seat 60 formed in the upper end of sleeve 24.

Sleeve 24 is arranged in assembly such that the poppet seat 60 formed is located a predetermined axial distance below the initial opening of sleeve flow port 40, defined herein as the "spool lap" As used by those skilled in the art, the spool lap distance refers to the distance a spool is designed to travel beyond the initial port closing position such that the spool must travel through this same distance in the opposite direction before the port begins to open. The longer this spool lap distance, the greater the sealing effect obtained as leakage between the spool and bore must travel a greater distance between ports. However, as related to spool-type valve elements, finite leakage will always occur in the closed position since there must be a finite tolerance between the spool and bore. Even with the most narrow manufacturing tolerances the spool must be capable of axial movement within the bore to function properly.

It is well-known that spool elements are the most desirable in any control application requiring a precision throttling control function. However, unless additional elements are properly provided in the control circuit in conjunction therewith, the leakage flow between the spool and bore will erode a pressure holding function when the spool is in a closed configuration.

In some applications such as referred to above, the prior art has sometimes tried to minimize the leakage effect by employing what is referred to in the art as a "selective fit", an expensive, high precision manufacturing technique. This is sometimes accompanied by designing relatively long spool laps. In either case, the result is additional expense and in the case of greater than usual lap distance, a larger valve assembly.

However, employing the teachings of the present invention, this problem is eliminated in a comparably simple and efficient manner. This is accomplished by providing the insert 24 forming poppet seat 60 which fully receives poppet end 53 only after spool 52 has traveled a finite distance beyond the closing position related to port 40.

This finite distance is referred to herein as the spool lap. Once end 53 is fully seated, the normal leakage flow associated with spool element 52 and bore 36 is isolated from port 28 by the metal to metal fit between poppet end 53 and seat 60. It is well recognized by those skilled in the art that poppet type elements, properly manufactured, have essentially no leakage in the closed position since a metal to metal contact is achieved which is held in place by pressure on one end of the poppet holding it on its seat.

The O-ring 44 seals any leakage path between the lower end of sleeve 22 and housing 20 to port 28. Any leakage path from recess 3B, located above opposing end of spool 52 to port 40 may be easily sealed by use of an O-ring 62 provided on an upper portion of spool element 52. O-ring 62 is located on element 52 to seat against an annular shoulder 64 provided at the junction of recess 38 and the top end of spool bore 36.

Appropriate dimensioning of the involved components assures that O-ring 62 sealingly engages shoulder 64 at the same time as poppet end 53 is fully seated on poppet seat 60 and that O-ring 62 becomes disengaged from shoulder 64 prior to spool element 52 reaching the open position relative to flow port 40. In this manner no drag is imposed on the spool 52 during its primary control movements relative to port 40.

The method of making and assembling the control valve apparatus of the present invention is not only unique but also provides a very efficient and practical means to make the novel valve structure described herein.

As earlier referred to, the annular upper portion 54 of insert 24 has its outer diameter ground to fit within spool bore 36 in the same manner as spool element 52. This is a standard relatively simple manufacturing process. The seat portion and poppet end 53 are machined and/or ground within typical manufacturing tolerances.

In assembly, insert 24 is first positioned within housing 20, which has been priorly machined through to the depth of the lower extension of spool bore 36 shown in FIG. 1 which communicates with housing flow port 28, and also machined to form the larger inner diameter of opening 23 accomodating the larger upper portion of sleeve 22.

Insert 24 is first positioned in sleeve 22. Next, spool element 52, provided with the priorly ground, tapered poppet end 53, is inserted into spool bore 36. To assure a very precise fit between poppet end 53 and seat 60, the hardness values between the spool element 52 and the insert 24 are chosen to permit the final fit to be accomplished by coining the poppet seat 60 with the poppet end 53. That is, the spool is positioned with poppet end 53 engaging seat 60. Holding the assembly in a fixture, sufficient force applied to the upper end of element 52 forces poppet end 53 against seat 60. Therefore seat 60, having a predetermined lower hardness value compared to spool element 52, is coined to precisely fit poppet end 53 in a relatively simple and inexpensive manner. Then the assembly of sleeve 22, insert 24 and spool 52 may be positioned in a conventional manner within the housing 20 as shown in FIG. 1.

As compared to attempting to hone a precision bore onto a seat which is truly concentric and aligned with that bore, the method described utilizing insert 24 provides relatively simple manufacture of a very precise poppet fit which requires only well-known manufacturing methods and grinding or honing operations within usual tolerance limits.

Further, during the process of coining the relationship between the poppet end 53 of spool 52 and seat 60, the tapered end walls of seat 60 spring outwardly to effect a tight interference fit between the outer walls of insert 60 and inner walls of bore 36 to fix insert in spool bore 36 to effectively form the same as a unitary construction between sleeves 22 and 24. Given the coining of the relationship of the poppet end 53 and seat 60 and the flared out deformation to the walls of insert 24, leakage is essentially eliminated by the precision fit accomplished. Otherwise only standard manufacturing tolerances need be employed in the manufacture of the described assembly.

O-ring 44 prevents any leakage which may occur between the outer walls of insert 24 and sleeve 22 or around the outer walls of sleeve 22 and housing 20 to effectively seal port 26 from port 28 when the poppet end 53 is fully seated on seat 60.

In this fully seated position described, there is still a predetermined spool lap distance between the seat 60 and port 26. Further, port 30 is sealed from port 26 by the spools own fit in the bore and O-ring 62 previously described.

When fully assembled with cap 48 in position, the spool element 52 is held in this closed position on the seat 60 via the force of spring 50 and the control pressure present at port 30.

The area of the poppet seat end in the seat engaging closed position is different than the area of the upper end of the spool and form a differential area between the ends of the spool.

The seat area, if desired, may be arranged by suitable design to be very close to full spool diameter by making the tapered inner walls of the upper end of insert 24 relatively thin. For example, the lower seat area may easily be about 90% of the upper end area, which is the full spool diameter. This would result in approximately an eleven percent area differential between the ends which has to be overcome by the initial opening pressure to break the spool poppet end 53 from the seat 60. This would normally not represent a particular probelm in most applications. However, other area differentials may be designed for a given control application as may be deemed desirable by controlling the wall thickness of upper portion 54 which forms seat 60.

Upon an opening pressure being present at port 28, the instant poppet end 53 disengages from the seat area of seat 60, spool element 52 will function as a conventional spool because the lower spool end area then expands to the full diameter area of the spool. Further, this expansion of spool area occurs prior to axial movement of the spool beyond the designed spool lap distance. Therefore spool element 52 is open relative to seat 60 but is still in the closed position relative to ports 26 and 40. Therefore there is no instant firing open as far as ports 26 and 40 are concerned, the spool merely proceeds toward the opening of port 26 and 40 in a normal manner associated with the operation of a conventional spool element. As the lap distance is traversed, operative flow begins from port 28 to ports 26 and 40 when the end of the primary spool outer diameter reaches port 40. Therefore when spool 52 moves from the seated relationship with seat 60, spool element 52 acts as if there is no poppet seat 60 involved. Therefore variations in pressure in either port 26 or port 28 will not be a problem as in a conventional poppet type valve. Once spool end 53 is unseated from seat 60, the control forces on spool element 52 act only on the spool's full area relationship unaffected by the seat 60.

Therefore, in accordance with the present invention a single valve element is made to operate as a true conventional spool to control operative flow and also as a poppet valve when it is seated on seat 60 which may be defined as a second closing position. The valve assembly retains the desirable characteristics and essentially eliminates those undesirable characteristics associated with either type of conventional spool and poppet valve elements.

Figure 3:
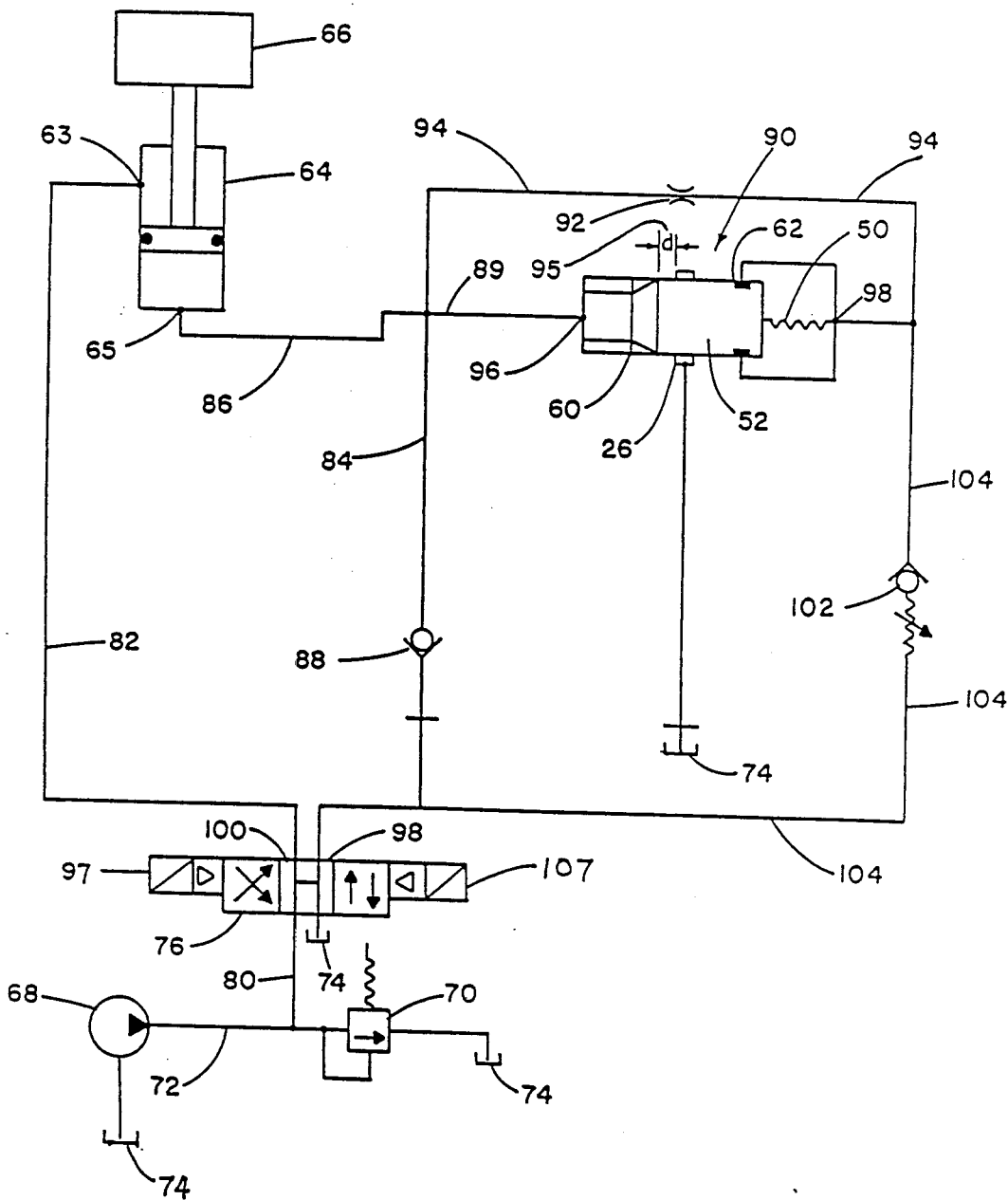
FIG. 3 is a diagrammatic view of a hydraulic circuit illustrating a relatively simple example of the advantageous use of the apparatus of the present invention.

As merely illustrative of the advantages of the present invention, a simple hydraulic circuit is diagramatically illustrated in FIG. 3.

In the example circuit shown, a vertically acting cylinder and piston assembly 64 are provided which supports a weight 66. This weight, for example, could represent the relatively heavy platen employed in a metal stamping press. The circuit further includes a conventional fixed displacement pump 6B which is limited to a maximum pressure by a conventional relief valve 70, operatively connected to the output line 72 between the pump 68 and tank 74. Merely as an example, the maximum pressure may be chosen as 2000 pound per square inch. A conventional solenoid operated, four-way valve, inicated generally at 76, is operatively communicated to the output line 72 from pump 6B.

Four-way valve 76 conventionally permits flow from pump 68 in both directions in response to the conventional actuation of the solenoids as described later herein. In the center position, valve 76 unloads pump 68 to tank 74 and releases pump pressure to both cylinder ports 63 and 65 by venting the valve ports to tank. Pump 68 is operatively connected to valve 76 via line 80. Valve 76 is connected to the upper chamber of the cylinder and piston assembly 64 via line 82 and cylinder port 63 and to the lower chamber of assembly 64 via lines 84 and 86 and cylinder port 65.

Figure 2:
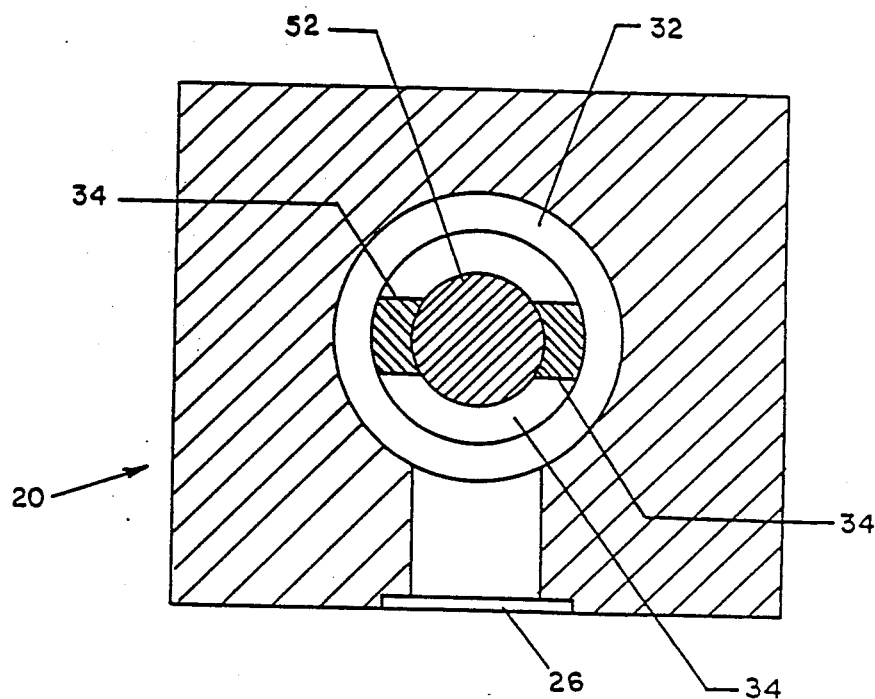
FIG. 2 is a plan sectional view of the apparatus shown in FIG. 1, the section being taken along line 2—2 in FIG. 1.

A check valve B8 is provided in line 84 to permit flow from pump 6B to enter cylinder port 65, but prevents flow in the opposite direction. Line B4 is also connected to the input line 89 of the novel fluid control valve assembly, indicated generally at 90, which represents the valve assembly of the present invention shown in FIGS. 1 and 2 herein. An orifice 92 is provided in line 94 which is operatively connected to the input port 96 of valve 90 and to the opposing side thereof at control port 98 to equalize pressure on both ends of the spool 52 when spool 52 is in the closed position as previously described herein.

As previously described spring 50 functions to provide a bias force to hold spool 52 closed against seat 60 until a sufficient pressure drop is developed across the spool to overcome the spring force. When spool 52 is in this closed position against seat 60, O-ring 62 engages the upper end of the spool bore as described earlier so that leakage normally associated with a spool valve element capable of modulating control functions is sealed by the seat engagement at one end and O-ring 62 at the other.

In the diagramatic illustration shown in FIG. 3, the dimension "d" at 95 represents the spool lap distance spool 52 must move away from seat 60 before the sleeve port 40 begins to open.

In operation, actuation of solenoid 96 shifts valve 76 to connect pump 68 to valve port 98 and line 84 through check valve 8S and cylinder port 65 to provide flow to the lower chamber of cylinder and piston assembly 64 to move the piston upwardly. Discharge flow via cylinder port 63 and line 82 enters valve port 100 which is connected to tank 74.

As the piston of assembly 64 rises, spool 52 of valve assembly 90 is held in the closed position by a pilot valve 102 which in turn is held closed as it is communicated via line 104 to line 84 and the pressure port 98 of valve 76. When valve 102 is closed no flow can occur across orifice 92.

At this point, pressure on both sides of spool 52 of valve assembly 90 is equalized and the spool 52 is held in the closed position on seat 60 by spring 50 and the differential area force. The outlet port 26 and, of course, sleeve port 40 of valve 90 is also closed.

As the piston of assembly 64 reaches the end of its work stroke, pressure rises in the lower chamber at cylinder port 65 and through the elements operatively communicated to one another in the circuit. Since the piston has done its work at the maximum pressure set by relief valve 70, the control sequence in the circuit is set to center valve 76 by de-energizing solenoid 97. Then pump 68 unloads as ports 98 and 100 are vented to tank 74 and valve 102 is permitted to open. The pressure in the lower chamber of cylinder and piston asembly 65 would immediately drop to a value set by pilot valve 102. For example, this value might be 750 psi, which in this example would be sufficient to hold the weight of the platen 66 supported by the piston, but would allow release of the pressure of the workload.

In the example circuit of FIG. 3 and in accordance with the present invention, this result is accomplished via the action of valve 90. At this point in the cycle spool 52 is allowed to open because flow occurs through orifice 92 and pilot valve 102 and develops a pressure drop across seat 60 between ports 96 and 9B sufficient to overcome the force of retaining spring 50. This pressure drop causes spool 52 to move away from seat 60.

However, as previously described, no flow will occur through port 26 until spool 52 has traversed a distance beyond the spool lap 95 so that the leading edge of spool 52 opens port 40. The instant spool 52 leaves the poppet seat 60, prior to any opening of spool port 40, spool 52 will function the same as a conventional spool element just as if no poppet seat 60 were present. The flow characteristics of spool 52 in this mode are the same as those of solely a modulating spool element having only those normal forces acting upon it. That is, only the force of the spring 50 and the jet forces of flow passing the leading edge of the spool element.

The pressure then drops from the original 2000 psi to 750psi as set by pilot valve 102 which has been vented to port 98 and tank. However, as the pressure tries to drop below the designed set pressure of 750 psi, pilot valve 102 closes. Preferably, valve 102 is of the pure poppet type having no fixed clearance to permit leakage.

Upon closing of pilot valve 102, no flow occurs across orifice 92 and pressures are again equalized at valve ports 96 and 98. Spool 52 moves from its modulating position toward poppet seat 60. Spring 50 urges the spool tightly against seat 60 and O-ring 62 moves to a position of sealed engagement with the spool bore. In this closed position spool 52 now functions as a sealed poppet element which does not permit leakage through either end of the spool element such as occurs through the finite clearance associated with conventional modulating spool elements.

Since no leakage occurs when valve 90 is in the closed mode, the pressure set by pilot valve 102 is held at the cylinder port 65 at the set value. It is also held by the check valve 8S which will not permit reverse flow as it may also be a conventional poppet element type.

The piston of assembly 64 then may be held for an indefinite period in this raised position without creeping downward as would occur via the minute leakage associated with a conventional modulating spool element. It should be noted that in many fluid control applications, such a function is very desirable. Prior to the present invention, the function performed by control valve 90 could only be accomplished using multiple valve arrangements and much more comple circuitry.

It should also be noted that in the example described, leakage is relatively easily prevented in a piston and cylinder assembly with the soft packing means employed around the head of the piston. Further, using pure poppet valves having only an open and closed function, not requiring precise modulation, such as the check valve 88 and pilot valve 102, assures that a tight, essentially pressure trapped system may be accomplished in a relatively simple manner in combination with the modulating spool function performed by valve 90 in accordance with the present invention.

The valve 90, in the circuit shown in FIG. 3, therefore functions as a trapping or blocking control valve and has allowed decompression of stored energy from the pressure stroke from 2000 psi to 750 psi in a controlled modulating manner.

Now on reversal in this circuit, one would not desire an uncontrolled drop of the mass of the platen. Therefore solenoid 107 would be energized to connect pump 6S to the upper chamber of the cylinder and piston assembly via cylinder port 63, line 82 and valve port 100. However, port 65 is still connected to the valve input port 96.

As pressure develops in the upper chamber of assembly 64, the pressure in the lower chamber at port 65 rises above the pressure set by pilot valve 102 causing valve 102 to open. Then a control flow occurs across orifice 92 and a pressure drop across ports 96 and 98 is sensed by spool 52 and it moves away from scat 60 and then opens port 26 to tank.

At this point, spool 52 is in the throttling or modulating mode and has no characteristics of a poppet element. There is no friction on spool 52 from O-ring 62 as it has been carried away from the spool bore and merely rides freely on the spool in recess 38 of sleeve 34 as seen in FIG. 1.

Therefore in the circuit described herein, during the piston reversal cycle, a back pressure having a value set by pilot valve 102 has been developed and the pump pressure is used to drive the piston of assembly 64 downward against this back pressure. In essence, valve 90 now functions as a modulating brake to allow the mass supported by the piston to drop in a smooth controlled manner rather than in a precipitous manner.

In view of the foregoing description, it should be readily appreciated that the valve assembly of the present invention possesses the desirable characteristics of both a poppet element and a spool element combined in a novel unitary manner which eliminates the undesriable characteristics of the conventional form of such elements.

Further, the control valve of the present invention operates as a poppet to hold pressure or as a spool to provide accurate modulating control automatically in response to the control function designed into the circuit. The simplicity of its construction and manufacture readily may be accomplished using standard manufacturing machines and processes which require only those normal tolerance limits typically employed in making conventional spool type elements. However, leakage losses typically associated with conventional spool elements in the closed or holding position are essentially eliminated.

What is claimed is:

1. A fluid power valving assembly comprising in combination, a housing provided with an interior annular bore and at least two axially spaced housing flow ports communicating with said annular bore; a first annular sleeve component fixedly mounted into said annular bore of said housing in axially concentric relationship therewith and including a central axially extending spool bore porvided with an annular larger than said spool bore at one end of said spool bore and including a flow control port disposed intermediate the ends of said first sleeve component and in communication with one of said housing flow ports; a second annular sleeve component inserted into the opposing end of said spool bore relative to said annular recess and including an axially extending annular bore communicating with said spool bore and forming an annular shoulder, said shoulder forming a valve poppet seat disposed a predetermined axial distance from said flow control port in said first sleeve component and between said housing flow ports, the axial distance between said flow control port in said first sleeve element and said valve poppet seat defining a spool lap; a cylindrical spool element slideably mounted in said spool bore and operable between closed and open positions relative to said flow control port in said first sleeve element to control an operative flow of fluid between said housing flow ports through said flow control port, said spool element including a first spool end portion movable into a sealed relationship with said valve poppet seat upon movement of said spool beyond said closed position an axial distance equal to said lap; and an opposing second spool end portion carrying a resilient sealing means, said sealing means movable from an unsealed to a sealed relationship with said spool bore when said first spool end moves to a sealed relationship with said valve poppet seat.

2. A fluid power control valve apparatus comprising in combination, housing means including a cylindrical spool bore; axially spaced fluid flow ports provided in said housing and communicating with said spool bore; an annular inwardly extending shoulder disposed in said bore and defining a poppet valve seat axially located a predetermined distance between said flow ports; and an elongate cylindrical spool element slideably mounted in said spool bore and operatively movable in an axial direction responsive to forces applied on either end of said spool element between open and closed positions relative to one of said flow ports disposed along the axial extent of said spool bore, said spool element having an end portion axially movable between a sealed and unsealed relationship relative to said poppet valve seat when said spool is in a closed position relative to said one of said flow ports and a resilient sealing means fixed on said spool element near an opposing end thereof relative to said end portion movable into sealed and unsealed relationship relative to said poppet seat, said sealing means being disposed in a sealed position relative to said spool bore only upon when said end portion is disposed in sealed relationship with said poppet seat.

3. The apparatus defined in claim 2 wherein said annular shoulder is formed by an annular insert member disposed into one end of said spool bore, said insert member including an axial bore communicating with said spool bore.

4. In a control valve apparatus, the combination of a cylindrical spool slideably mounted in a spool bore and having a tapered end portion, a pair of operative flow ports axially spaced along said spool bore and communicating therewith, said spool being axially movable to define open and closed positions relative to at least one of said flow ports disposed along the axial extent of said spool bore responsive to a force differential applied to opposing ends of said spool; an annular, inwardly extending shoulder disposed in said spool bore between said flow ports and forming a poppet seat configured to receive said tapered end portion in a fully seated, sealed relationship upon axial movement of said spool element a predetermined distance beyond said closed position relative to said one of said flow ports; and a sealing means fixed on said spool near the opposite end thereof relative to said tapered end portion and movable into a sealed relationship relative to said spool bore upon movement of said spool to dispose said tapered end portion of said spool into a fully seated position upon said poppet seat.

* * * * *